US010222615B2

(12) United States Patent
Lowney et al.

(10) Patent No.: US 10,222,615 B2
(45) Date of Patent: Mar. 5, 2019

(54) OPTICAL WAVEGUIDE WITH COHERENT LIGHT SOURCE

(71) Applicant: Microsoft Technology Licensing, LLC, Redmond, WA (US)

(72) Inventors: Joseph Daniel Lowney, Bothell, WA (US); Richard Andrew Wall, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/607,271

(22) Filed: May 26, 2017

(65) Prior Publication Data

US 2018/0341045 A1    Nov. 29, 2018

(51) Int. Cl.
  *G02B 27/01* (2006.01)
  *G02B 6/122* (2006.01)
  *G02B 1/10* (2015.01)

(52) U.S. Cl.
  CPC .......... *G02B 27/0101* (2013.01); *G02B 1/10* (2013.01); *G02B 6/122* (2013.01); *G02B 27/01* (2013.01); *G02B 2027/0118* (2013.01)

(58) Field of Classification Search
  None
  See application file for complete search history.

(56) References Cited

U.S. PATENT DOCUMENTS

| 5,861,991 A | 1/1999 | Fork |
| 7,580,189 B2 | 8/2009 | Urey et al. |
| 8,160,411 B2 | 4/2012 | Levola et al. |
| 8,611,014 B2 | 12/2013 | Valera et al. |
| 2001/0000124 A1 | 4/2001 | Kollin et al. |
| 2003/0173892 A1 | 9/2003 | Terashita |
| 2004/0179128 A1 | 9/2004 | Oikawa |

(Continued)

FOREIGN PATENT DOCUMENTS

| TW | 200419220 A | 10/2004 |
| WO | 2006064334 A1 | 6/2006 |

(Continued)

OTHER PUBLICATIONS

Powell, et al., "Novel approach to exit pupil expansion for wearable displays", In Proceedings of SPIE, Helmet- and Head-Mounted Displays VII, vol. 4711, Aug. 5, 2002, 2 pages. (abstract).

(Continued)

*Primary Examiner* — Mike Stahl
(74) *Attorney, Agent, or Firm* — Holzer Patel Drennan

(57) ABSTRACT

A waveguide increases the optical path of a portion of light received from a coherent light source. The waveguide includes a first element that allows light from an exit pupil of a coherent light source to enter the waveguide, and a second element that directs some of the entered light to exit the waveguide through a first set of pupils. The waveguide includes additional elements that cause the remaining light to make an additional path through the waveguide and the second element before exiting through a second set of pupils to increase the path of the exiting light. The pupils of the first set and the second set are staggered so that light exiting a pupil does not interfere with the light exiting via the neighboring pupils.

17 Claims, 7 Drawing Sheets

(56) References Cited

U.S. PATENT DOCUMENTS

| | | | |
|---|---|---|---|
| 2004/0257664 A1* | 12/2004 | Hashimoto | G02B 27/1033 |
| | | | 359/636 |
| 2007/0159673 A1 | 7/2007 | Freeman et al. | |
| 2009/0161191 A1 | 6/2009 | Powell | |
| 2010/0079861 A1 | 4/2010 | Powell | |
| 2010/0111472 A1 | 5/2010 | Dejong | |
| 2011/0013245 A1* | 1/2011 | Tanaka | G02B 26/105 |
| | | | 359/201.2 |
| 2011/0044579 A1 | 2/2011 | Travis et al. | |
| 2011/0164166 A1 | 7/2011 | Oikawa | |
| 2012/0257282 A1 | 10/2012 | Hudman | |
| 2013/0188391 A1* | 7/2013 | Futterer | G02B 6/0031 |
| | | | 362/608 |
| 2013/0250431 A1 | 9/2013 | Robbins et al. | |
| 2013/0314789 A1 | 11/2013 | Saarikko et al. | |
| 2014/0140653 A1 | 5/2014 | Brown et al. | |
| 2014/0293434 A1 | 10/2014 | Cheng et al. | |
| 2015/0117808 A1 | 4/2015 | Chen et al. | |
| 2015/0124317 A1 | 5/2015 | Macnamara | |
| 2015/0234101 A1 | 8/2015 | Mercer | |
| 2015/0235457 A1 | 8/2015 | Schowengerdt | |
| 2015/0241704 A1 | 8/2015 | Schowengerdt et al. | |
| 2015/0247975 A1 | 9/2015 | Abovitz et al. | |
| 2015/0346490 A1 | 12/2015 | Tekolste et al. | |
| 2017/0034435 A1* | 2/2017 | Vallius | H04N 5/23229 |

FOREIGN PATENT DOCUMENTS

| | | |
|---|---|---|
| WO | 2016020643 A1 | 2/2016 |
| WO | 2017034765 A1 | 3/2017 |

OTHER PUBLICATIONS

Yamamoto, et al., "Influence of Light Coherence at the Exit Pupil of the Condenser on the Image Formation", In Optica Acta_ International Journal of Optics, vol. 23, Issue 12, 1976, 2 pages. (abstract).

Han, et al., "Portable Waveguide Display System With a Large Field of View by Integrating Freeform Elements and Volume Olograms", In Journal of Optics Express, vol. 23, Issue 3, Feb. 9, 2015, pp. 3534-3549.

"International Search Report & Written Opinion Issued in PCT Application No. PCT/US2018/029674", dated Aug. 24, 2018, 13 Pages.

"Non Final Office Action Issued in U.S. Appl. No. 15/589,478", dated Nov. 15, 2018, 7 Pages.

\* cited by examiner

OPTICAL WAVEGUIDE WITH COHERENT LIGHT SOURCE

BACKGROUND

Optical waveguides can be used to expand or replicate the exit pupil of an imaging system in one or two dimensions. Typically, light from the exit pupil of the imaging system is received in the waveguide through an entrance or in-coupling, and travels through the waveguide in a direction, while some of the light exits a grating structure of the waveguide creating an expanded pupil. The remaining light that does not exit the grating structure is wasted and typically exits or is absorbed at the edges of the waveguide. Current waveguides typically use low-efficiency single pass grating structures to achieve pupil uniformity and field of view uniformity, which results in a large amount of wasted light.

One issue with current waveguide-based exit pupil expanders is they are designed to use incoherent light sources. An incoherent light source is a light source whose light contains a broad range of frequencies and thus a short coherence length on the order of 10 periods. An example of an incoherent light source is an LED. Coherent light sources, on the other hand, are light sources containing a narrow range of frequencies and thus a longer coherence length. Coherent light sources when split into multiple paths will generally interfere with themselves when recombined if the difference in optical path length traversed by each optical path of the light is less than a coherence length associated with the coherent light source. An example of a coherent light source is a laser.

In order to achieve a uniform display intensity of the expanded pupil, the distance between each exit pupil of the waveguide is typically small so that the viewer receives overlapping light from multiple pupils. However, because of the closeness of the pupils, and the similar optical paths of the light received from each pupil, when the waveguide is used with a coherent light source the overlapping light will interfere with itself and may result in a diminished experience for the user.

SUMMARY

An optical waveguide that increases the relative optical path length of a portion of light relative to another portion of light received from a coherent light source is provided. In one example, the waveguide includes a first optical element that allows light from an exit pupil of a coherent light source to enter the waveguide, and a second optical element that directs some of the entered light to exit the waveguide through a first set of exit pupils. The waveguide includes one or more additional optical elements that cause the remaining light to make an additional path through the waveguide and the second optical element before exiting through a second set of exit pupils to increase the optical path of this light. The exit pupils of the first set and the second set are staggered so that light exiting a pupil does not overlap with the light exiting a pupil from the same set. Because the light exiting the second set of pupils has a greater optical path than the light exiting the first set of exit pupils, the exit pupils from the first and second set cannot interfere with each other and can therefore be placed close together.

In an implementation, an optical waveguide is provided. The optical waveguide includes a front surface and a rear surface. The optical waveguide further includes a first optical element and a second optical element. The first optical element is configured to allow light from a coherent light source to enter the optical waveguide through the front or rear surface, wherein the light source is associated with a coherence length. The second optical element is configured to allow a first portion of the light to exit the optical waveguide through the front or rear surface with a first optical path length, and allow a second portion of the light to exit the optical waveguide through the front or rear surface with a second optical path length, wherein a difference between the first optical path length and the second optical path length is greater than the coherence length.

In an implementation, a head mounted display device is provided. The head mounted display includes: a coherent light source, wherein the coherent light source is associated with a coherence length; a controller coupled to the coherent light source and configured to cause the coherent light source to project light comprising a display image; and a plurality of optical waveguides. Each optical waveguide comprises: a first end; a second end; a first optical element configured to allow the light to enter into the optical waveguide and cause the light to traverse in a first direction towards the first end; a second optical element configured to receive the light traversing in the first direction from the first optical element and allow a first portion of the light traversing in the first direction to exit out of the optical waveguide, wherein the first portion of light has a first optical path length; and a third optical element configured to: receive a second portion of the light traversing in the first direction from the second optical element; and cause a third portion of the light to traverse in a second direction towards the second end, wherein the second optical element is further configured to receive the third portion of the light traversing in the second direction from the third optical element and allow a fourth portion of the light traversing in the second direction to exit out of the optical waveguide, wherein the fourth portion of the light has a second optical path length, and further wherein a difference between the first optical path length and the second optical path length is greater than the coherence length.

In an implementation, an optical waveguide is provided. The optical waveguide includes a first surface and a second surface; a first optical element that allows light received from a coherent light source to enter the optical waveguide through the first or second surface and traverse in a first direction within the optical waveguide, wherein the coherent light source has a coherence length; a second optical element that receives the light traversing in the first direction, causes a first portion of the light to exit the optical waveguide through the first or second surface, and allows a second portion of the light to continue to traverse in the first direction, wherein the first portion of light has a first optical path length; and a third optical element that receives the second portion of the light traversing in the first direction, and causes a third portion of the light to traverse in a second direction within the optical waveguide, wherein the second optical element further receives the third portion of the light, and allows a fourth portion of the light to exit the optical waveguide through the first or second surface, wherein the fourth portion of light has a second optical path length, and further wherein a difference between the first optical path length and the second optical path length is greater than the coherence length.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
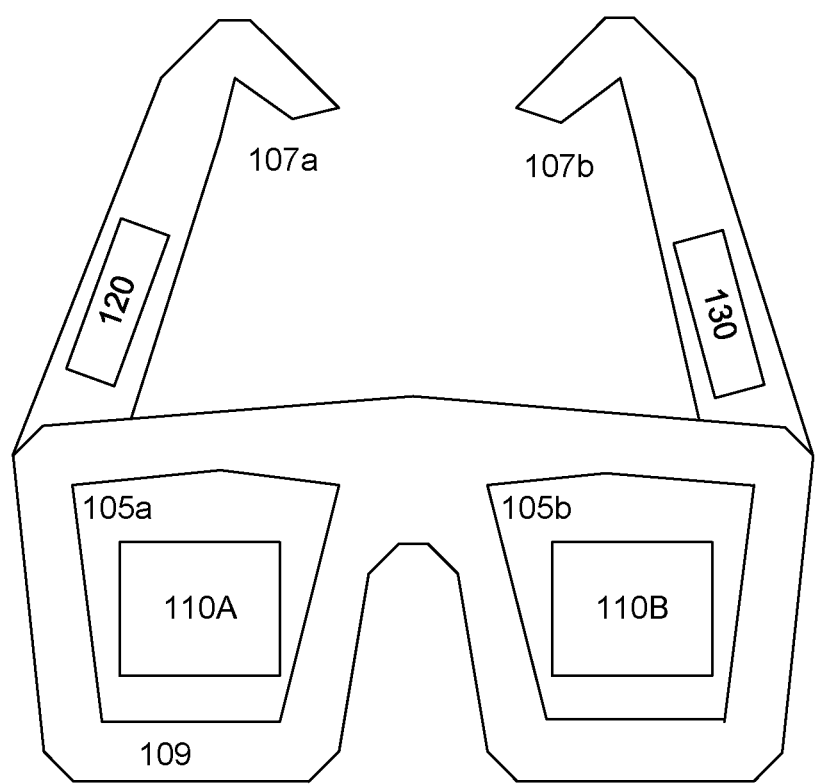
FIG. 1 is an illustration of an exemplary head mounted display device.

FIG. 1 is an illustration of an example head mounted display ("HMD") device 100. In an implementation, the HMD device 100 is a pair of glasses. The HMD device 100 includes lenses 105a and 105b arranged within a frame 109. The frame 109 is connected to a pair of temples 107a and 107b. Arranged between each of the lenses 105 and a wearer's eyes is a near-eye display system 110. The system 110A is arranged in front of a right eye and behind the lens 105A. The system 110B is arranged in front of a left eye and behind the lens 105B. The HMD device 100 also includes a controller 120 and one or more sensors 130. The controller 120 may be a microcomputer operatively coupled to both near-eye display systems 110A and 110B and to the sensors 130. Other types of controllers 120 may be used.

Sensors 130 may be arranged in any suitable location on the HMD device 100. They may include a gyroscope or other inertial sensors, a global-positioning system (GPS) receiver, and/or a barometric pressure sensor configured for altimetry. These sensors 130 may provide data on the wearer's location or orientation. From the integrated responses of the sensors 130, the controller 120 may track the movement of the HMD device 100 within the wearer's environment.

In some implementations, sensors 130 may include an eye tracker that is configured to detect an ocular state of the wearer of the HMD device 100. The eye tracker may locate a line of sight of the wearer, measure an extent of iris closure, etc. If two eye trackers are included, one for each eye, then the two may be used together to determine the wearer's focal plane based on the point of convergence of the lines of sight of the wearer's left and right eyes. This information may be used by controller 120 for placement of a computer-generated display image, for example.

In some implementations, each near-eye display system 110A and 110B may be at least partly transparent, to provide a substantially unobstructed field of view in which the wearer can directly observe their physical surroundings. Each near-eye display system 110A and 110B may be configured to present, in the same field of view, a computer-generated display image.

The controller 120 may control the internal componentry of near-eye display systems 110A and 110B to form the desired display images. In an implementation, the controller 120 may cause near-eye display systems 110A and 110B to display approximately the same image concurrently, so that the wearer's right and left eyes receive the same image at approximately the same time. In other implementations, the near-eye display systems 110A and 110B may project somewhat different images concurrently, so that the wearer perceives a stereoscopic, i.e., three-dimensional, image.

In some implementations, the computer-generated display image and various real images of objects sighted through the near-eye display systems 110 may occupy different focal planes. Accordingly, the wearer observing a real-world object may shift their corneal focus to resolve the display image. In other implementations, the display image and at least one real image may share a common focal plane.

In the HMD device 100, each of the near-eye display systems 110A and HUB may also be configured to acquire video of the surroundings sighted by the wearer. The video may include depth video and may be used to establish the wearer's location, what the wearer sees, etc. The video acquired by each near-eye display system 110 may be received by the controller 120, and the controller 120 may be configured to process the video received. To this end, the HMD device 100 may include a camera. The optical axis of the camera may be aligned parallel to a line of sight of the wearer of the HMD device 100, such that the camera acquires video of the external imagery sighted by the wearer. As the HMD device 100 may include two near-eye display systems—one for each eye—it may also include two cameras. More generally, the nature and number of the cameras may differ in the various embodiments of this disclosure. One or more cameras may be configured to provide video from which a time-resolved sequence of three-dimensional depth maps is obtained via downstream processing.

No aspect of FIG. 1 is intended to be limiting in any sense, for numerous variants are contemplated as well. In some embodiments, for example, a vision system separate from the HMD device 100 may be used to acquire video of what the wearer sees. In some embodiments, a single near-eye display system extending over both eyes may be used instead of the dual monocular near-eye display systems 110A and 110B shown in FIG. 1.

The HMD device 100 may be used to support a virtual-reality ("VR") or augmented-reality ("AR") environment for one or more participants. A realistic AR experience may be achieved with each AR participant viewing their environment naturally, through passive optics of the HMD device 100. Computer-generated imagery may be projected into the same field of view in which the real-world imagery is received. Imagery from both sources may appear to share the same physical space.

The controller 120 in the HMD device 100 may be configured to run one or more computer programs that support the VR or AR environment. In some implementations, one or more computer programs may run on the controller 120 of the HMD device 100, and others may run on an external computer accessible to the HMD device 100 via one or more wired or wireless communication links. Accordingly, the HMD device 100 may include suitable wireless componentry, such as Wi-Fi.

Figure 2:
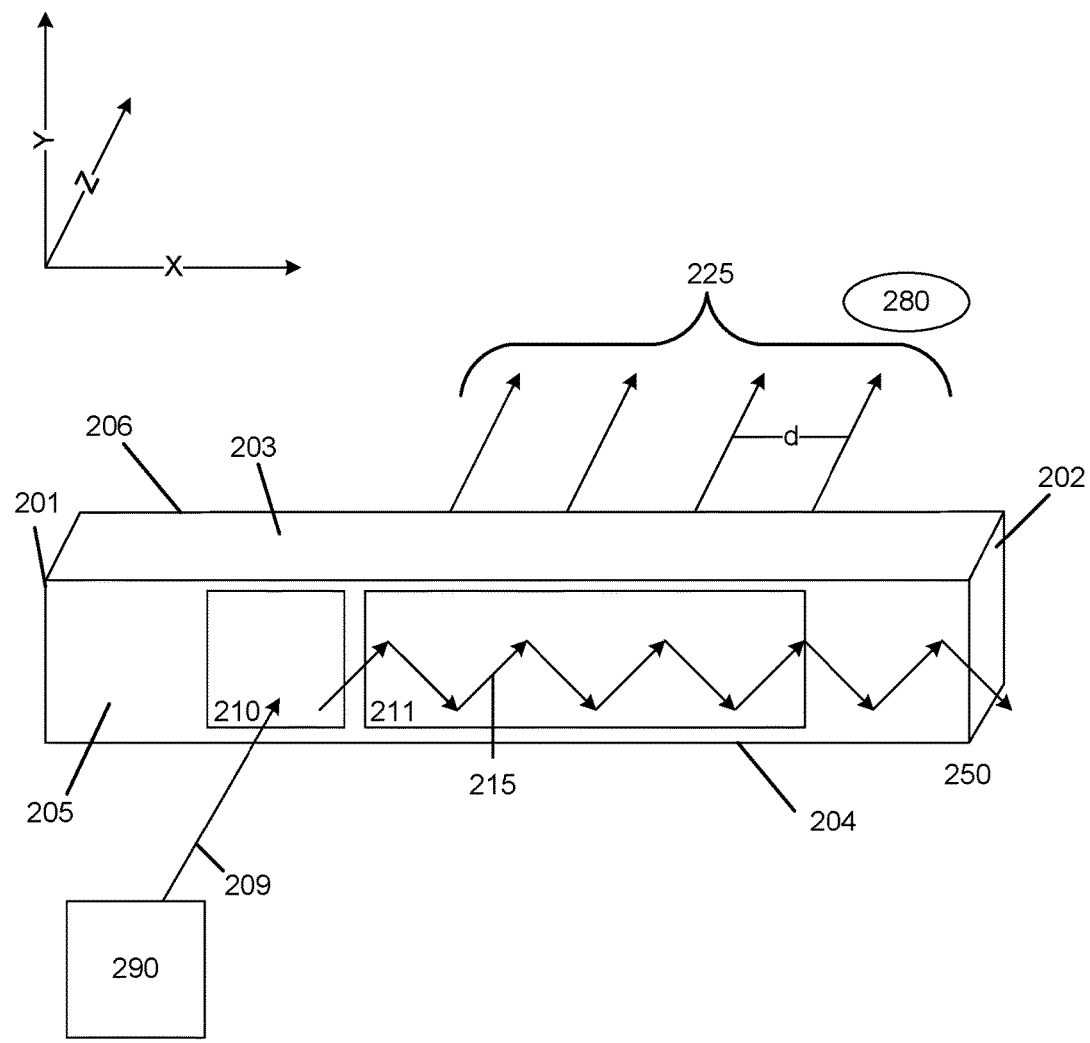
FIG. 2-6 are illustrations of exemplary near-eye display systems.

FIG. 2 is an illustration of an exemplary near-eye display system 200. The near-eye display system 200 may be an implementation of one or both of the near-eye display systems 110A and 110B shown in FIG. 1. In the example shown, the system 200 includes a projector 290 and an optical waveguide 250.

The projector 290 may be adapted to form a display image, and to project the display image through an exit pupil of the projector 290. Light corresponding to the display image is shown in the environment 200 as light 209. The projector 290 may be operatively coupled to the controller 120 (not pictured). The controller 120 may provide suitable control signals that, when received by the projector 290, cause the desired display image to be formed.

The optical waveguide 250 may include a plurality of surfaces including a front surface 205, a rear surface 206, a top surface 203, a bottom surface 204, a left-side surface 201, and a right-side surface 202. The optical waveguide 250 may be substantially transparent to light received normal to the front surface 205 in the z direction. Light received normal to the front surface 205 may pass through the front surface 205 and the rear surface 206 to an eye 280 of a wearer of the HMD device 100 that includes the optical waveguide 250. Thus, when the optical waveguide 250 is positioned in front of the eye 280 of the wearer of the HMD device 100, the optical waveguide 250 does not obstruct the ability of the wearer to view external imagery.

The optical waveguide 250 further includes an optical element 210. The optical element ("OE") 210 may receive the light 209 from an exit pupil of the projector 290, and may cause a portion of the light 209 to enter the optical waveguide 250 (i.e., in-couple). The portion of the light 209 that enters the optical waveguide 250 is illustrated in the optical waveguide 250 as the light 215 using solid arrows. Depending on the implementation, the OE 210 may be a diffractive OE such as a diffractive grating. Examples of suitable diffractive gratings include surface-relief diffraction gratings ("SRGs") or volumetric gratings. However, other types of OEs may be used such as mirrors and prisms, for example.

The OE 210 may cause the light 215 to propagate in the x direction towards the right-side surface 202. In particular, the OE 210 may cause the light 215 to propagate in the x direction by reflecting off of interior surfaces of the optical waveguide 250.

The optical waveguide 250 may further include an OE 211. As the light 215 propagates through the optical waveguide 250 and passes through the OE 211, the OE 211 may allow at least a portion of the light 215 to exit the optical waveguide 250 (i.e., out-couple) through the rear surface 206 as the light 225. Each ray of the light 225 may leave the rear surface through an exit pupil of the optical waveguide 250. The light 225 may form the eye box, and may be received by the eye 280 of a wearer of the HMD device 100. Like the OE 201, the OE 211 may be a diffractive coating on the front surface 205 such as an SRG. Other types of diffractive gratings may be used. While shown on the front surface 205, the OE 211 may also be applied to the rear surface 206, The number and locations of the exit pupils of the optical waveguide 250 may depend on the properties of the OE 211.

The portion of the light 2:15 that does not exit the optical waveguide 250 through an exit pupil may continue in the x direction towards the right-side surface 202. The light 215 may exit the optical waveguide 250 through the right-side surface 202, or another surface of the optical waveguide 250.

As may be appreciated, the light 225 exiting the optical waveguide 250 through the exit pupils of the OE 211 is a pupil expansion of the exit pupil of the projector 290. Each arrow representing the light 225 may exit through an exit pupil of the optical waveguide 250. The distance d between the arrows shown in FIG. 2 is referred to as the step. Generally, a large step or distance d between exit pupils may result in dark spots or uneven uniformity of the display image in the eye box.

Typically, projectors 290 use incoherent light sources, rather than coherent light sources, to generate the light 209 that is used to form the display image. A coherent light source may be a light source whose output light 209 includes photons that are oscillating in the same direction. This is in contrast with incoherent light sources where the photons may be oscillating in different directions. Examples of coherent light sources include lasers, and examples of incoherent light sources include LED light sources.

While coherent light sources have many advantages over incoherent light sources including higher power output and efficiency, they have one major drawback in that they are incompatible with the small steps sizes or d that is used by current HMD devices 100. The length of an optical path of a ray of light is the total distance that the ray of light travels from the projector 290 until it is received by the eye 280, and includes the distance that the ray travels through the optical waveguide 250 as the light 215, and the distance that the light travels from the rear surface 206 to the eye 280 as the light 225. Because of the coherence of the light, the rays of the light 225 generated by the coherent light source may interfere with each other if the difference between the lengths of the optical paths of the rays do not exceed what is referred to as the coherence length of the coherent light source.

Typically, the coherence length of a coherent light source is in the order of millimeters. Because of the small size of the optical waveguide 250, all of the rays of the light 225 that are exiting the rear surface 206 through the exit pupils of the OE 211 may have optical path lengths that are close to each other. As a result, if more than one ray of the light 225 reaches the eye 280 (i.e., the exit pupils overlap), the rays will interfere with each other which may result in a poor visual experience for the user.

Thus, in implementations where the projector 290 uses a coherent light source, the OE 211 must be chosen such that the distance d is large enough to ensure that the exit pupils do not overlap. However, as noted above, large distances d between exit pupils may cause uniformity issues and may result in a poor display experience for the wearer of the HMD device 100.

Accordingly, as described further herein, to allow for the use of coherent light sources in the optical waveguide 250 while avoiding the uniformity issues associated with non-overlapping exit pupils, the optical waveguide 250 may be modified such that light entering the optical waveguide is split into a first portion and a second portion. The first portion of the light travels a first optical path through the optical waveguide 250 before it exits the optical waveguide through a first set of exit pupils of the OE 211. The second portion of the light travels a second optical path through the optical waveguide 250 before it exits a second set of exit pupils of the OE 211. The difference between the first optical path and the second optical path is greater than the coherence length of the coherent light source such that light from an exit pupil of the first set of exit pupil does not interfere with light from an exit pupil of the second set of exit pupils. The exit pupils from the first set and the second set are staggered so that exit pupils from the first set of exit pupils overlap exit pupils from the second set of exit pupils, but exit pupils from the same sets of exit pupils do not overlap.

Figure 3:
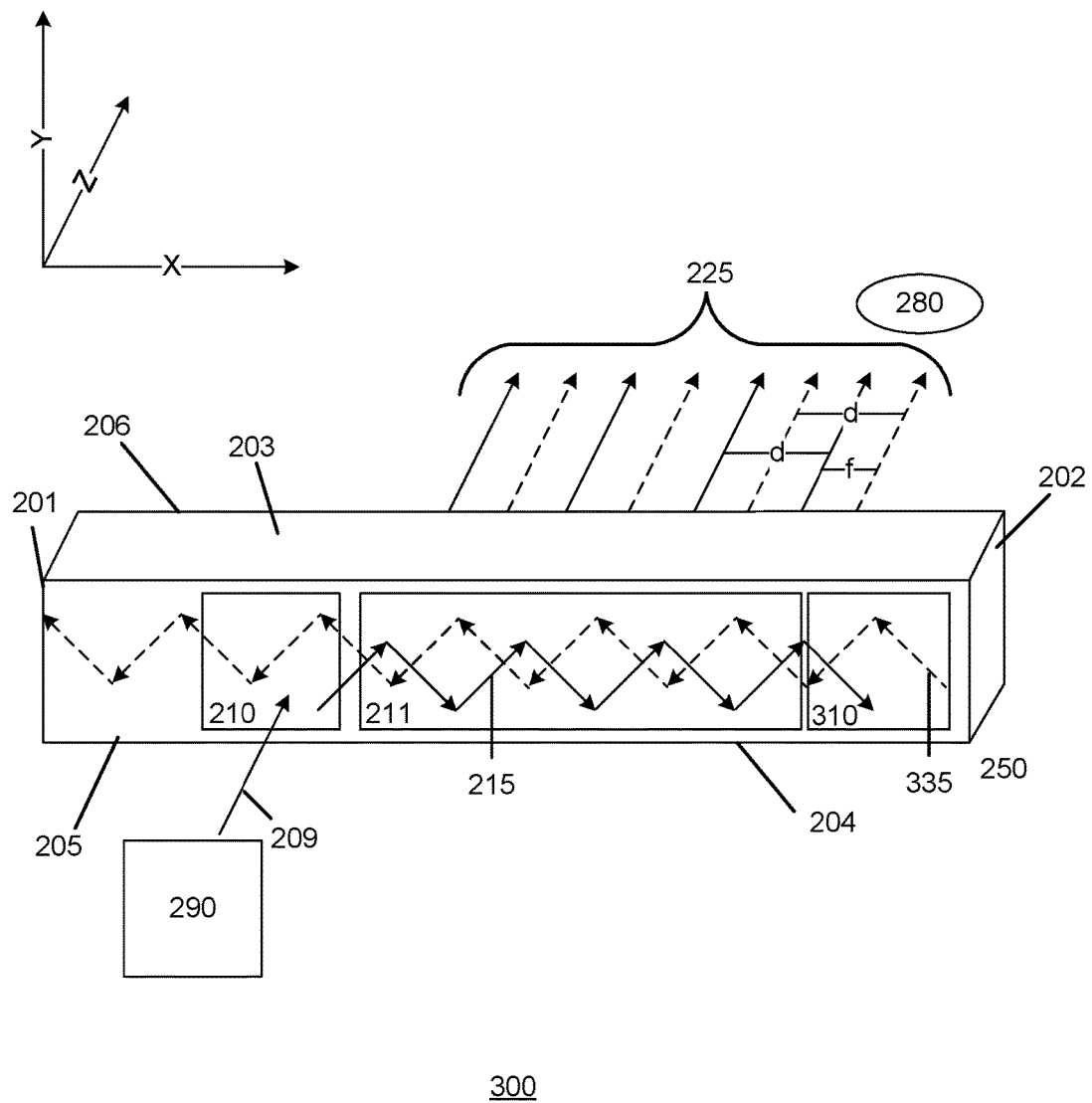

FIG. 3 is an illustration of an exemplary near-eye display system 300. Like the near-eye display system 200, the system 300 includes the projector 290 and the optical waveguide 250. The projector 290 may use a coherent light source.

Similar to the system 200, when the light 209 enters the optical waveguide 250 it travels in the x direction as the light 215 and passes through the OE 211, where some of the light 215 exits the optical waveguide 250 through one or more exit pupils as the light 225. The light 225 corresponding to the light 215 is shown by the solid arrows. The distance between each of the solid arrow is d, which may be selected to ensure that no more than one ray of light that corresponds to the light 215 is able to reach the eye 280.

To increase the exit pupil density and to avoid interference of the light 225 due to the coherent light source, the optical waveguide 250 of the system 300 has been updated to include an additional OE 310 near the right-side surface 202 that causes a portion of the light 215 to be reflected back through the OE 211 in a direction that is the opposite of the x direction. The reflected portion of the light 215 is the light 335 and is illustrated in the optical waveguide 250 using a series of hashed arrows. Thus, instead of exiting the optical waveguide 250 at the right-side surface 202, at least of a portion of the light 215 makes a second pass through the OE 211 as the light 335, which may improve both the intensity and the uniformity of the light 225 received at the eye 280.

In the example shown, the light 335 may be reflected by the OE 310. Similar to the OEs 210 and 211, the OE 310 may be a diffractive OE such as a coating on the front surface 205 (or the rear surface 206) of the optical waveguide 250. However, other types of OEs, coatings, diffractive gratings, or structures may be used to reflect the light 335.

Depending on the implementation, the OE 310 may have a grating vector with a value that is approximately double of a value of a grating vector of the OE 210 and the OE 211. Thus, if the OE 210 has a grating vector with a value of k, then the OE 310 may have a grating vector with a value of 2(k). Other grating vector values may be supported.

Similar to the light 215, the light 335 is reflected off the internal surfaces of the optical waveguide 250 as it moves through the optical waveguide 250 in the y direction. As the light 335 passes through the OE 211, a portion of the light 335 exits the front surface 205 or rear surface 206 of the optical waveguide 250 through one or more exit pupils as part of the light 225. The portions of the light 335 exiting the front surface 205 or the rear surface 206 is indicated in the light 225 by the hashed arrows.

As can been seen in FIG. 3, the exit pupils corresponding to the light 215 and the light 335 are staggered such that exit pupils used by the light 335 are located between the exit pupils used by the light 215. The distance between the adjacent exit pupils is shown as the distance f. The distance f is less than the distance d.

Because the light 335 travels a greater distance in the optical waveguide 250 before exiting the optical waveguide 250 than the light 215, a difference between the optical paths of the light 335 and the light 215 may exceed the coherence length of the coherent light source. Accordingly, the light 225 from adjacent exit pupils received by the eye 280 can overlap without causing interference, while the light from the non-adjacent exit pupils remains non-overlapping. Note that the distance d remains the same between exit pupils associated with light having the same optical path length.

Figure 4:
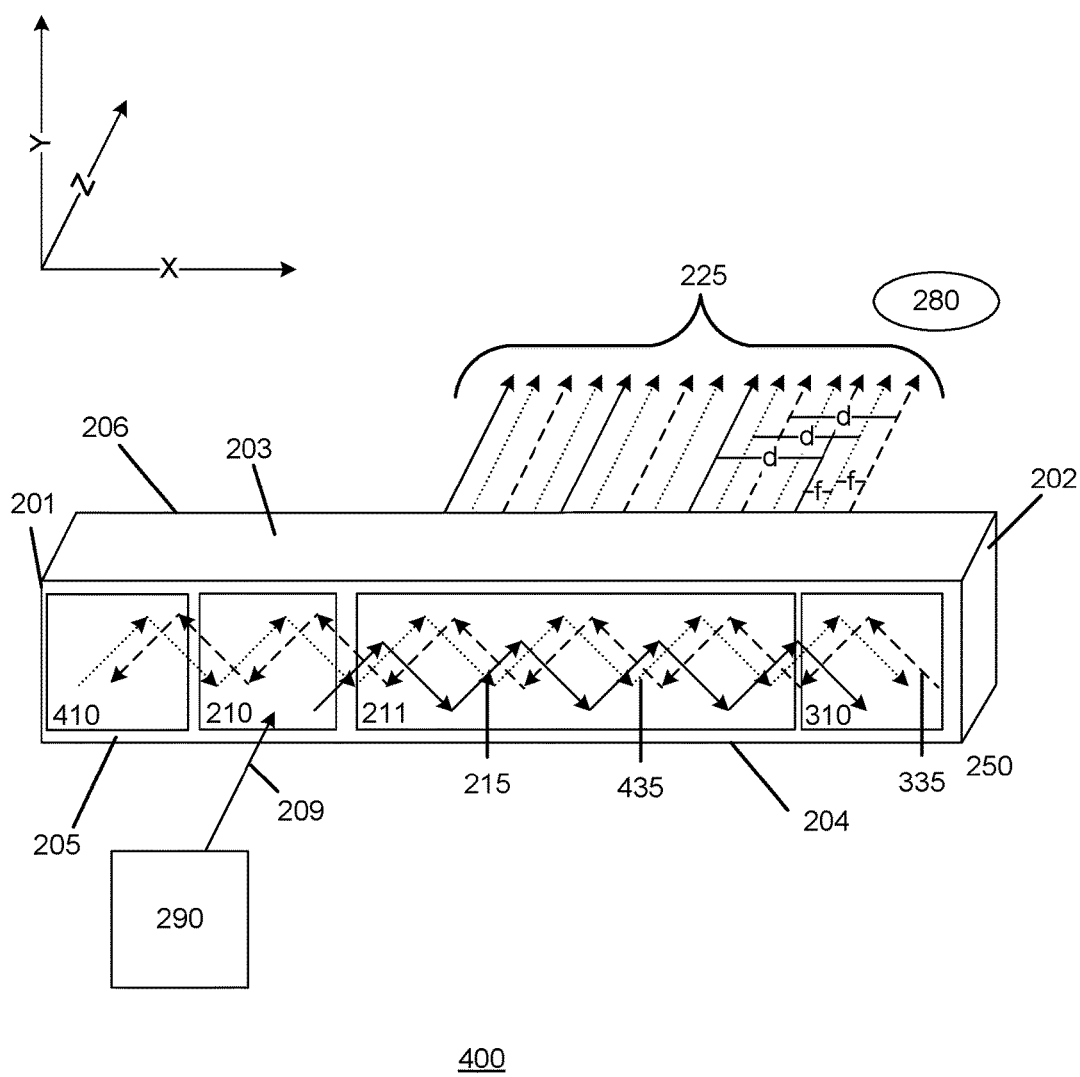

FIG. 4 is an illustration of an exemplary near-eye display system 400. Like the near-eye display systems 200 and 300, the system 400 includes the projector 290 and the optical waveguide 250. The projector 290 may use a coherent light source.

To further increase the intensity and uniformity of the light 225 received by the eye 280, the optical waveguide 250 of FIG. 3 has been updated to include an additional OE 410 near the left-side surface 201 that causes a portion of the light 335 to be reflected back through the OE 211 in the x direction. The reflected portion of the light 335 is the light 435 and is illustrated in the optical waveguide 250 using a series of dotted arrows.

In the example shown, the light 435 may be reflected by the OE 410. Similar to the OEs 210, 211, and 310, the OE 410 may be a diffractive OE, and may be a coating on the front surface 205 or rear surface 206 of the optical waveguide 250 such as an SRG or other type of diffractive grating. However, other types of OEs, coatings, or structures may be used to reflect the light 435. Also similar to the OE 310, the OE 410 may have a grating vector with a value that is approximately double a value of a grating vector of the OE 210 and the OE 211. Other grating vector values may be supported.

Similar to the light 215 and 335, the light 435 is reflected off the internal surfaces of the optical waveguide 250 as it moves through the optical waveguide 250 in the x direction. As the light 435 passes through the OE 211, a portion of the light 435 exits the rear surface 206 (or front surface 205) of the optical waveguide 250 through one or more exit pupils as part of the light 225. The portions of the light 435 exiting the rear surface 206 is indicated in the light 225 by the dotted arrows.

As can been seen in FIG. 4, the exit pupils corresponding to the light 215, the light 335, and the light 435 are staggered. The distance between the adjacent exit pupils is shown as the distance f. Because the light 435 travels a greater distance in the optical waveguide 250 before exiting the optical waveguide 250 than either the light 215 or the light 335, a difference between the optical paths of the light 335 and the light 435 (and the light 215 and the light 435) exceeds the coherence length of the light source. Accordingly, the light 225 from adjacent exit pupils received by the eye 280 can further overlap without causing interference.

Figure 5:
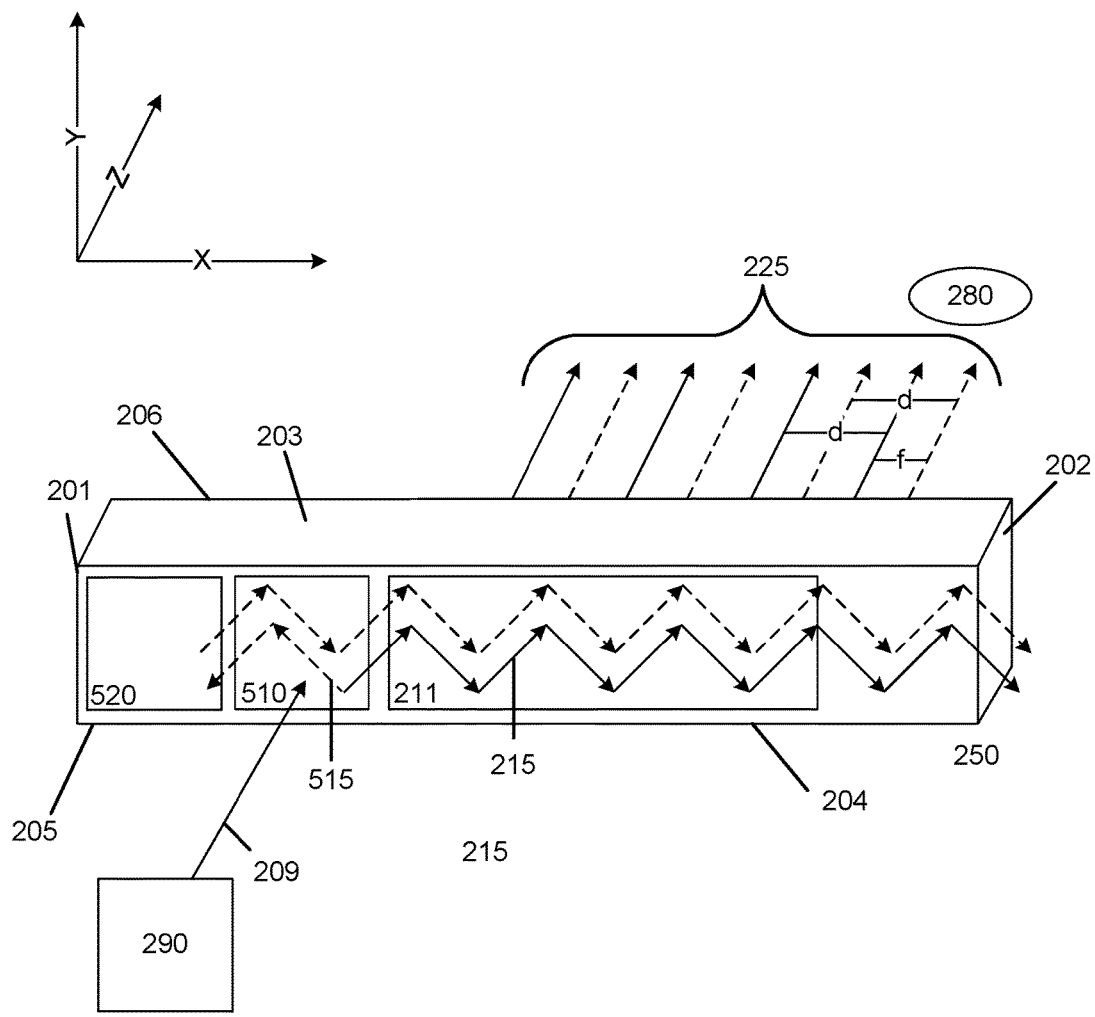

FIG. 5 is an illustration of an exemplary near-eye display system 500. Like the near-eye display systems 200, 300, and 400, the system 500 includes the projector 290 and the optical waveguide 250. The projector 290 may use a coherent light source.

As another example, the optical waveguide 250 has been updated to replace the OE 210 with an OE 510. The OE 510 may be a diffractive OE (or other type of OE) that causes a portion of the light 209 to enter the optical waveguide 250. However, rather than cause the light 209 to propagate in the x direction, the OE 510 may cause the light 209 to propagate through the optical waveguide 250 in both the x direction and the y direction. The portion of the light 209 that is propagating in the x direction is the light 215 and is illustrated using the solid arrows. The portion of the light 209 that is propagating in the opposite direction is the light 515 and is illustrated using the hashed arrows.

In addition, the optical waveguide 250 includes an OE 520 near the left-side surface 201 that causes a portion of the light 515 to be reflected through the optical waveguide 250 in the x direction. The OE 520 may be a diffractive OE or another type of OE.

As both the light 215 and the light 515 propagate through the optical waveguide 250 and pass through the OE 211, the OE 211 may allow at least a portion of the light 215 and the light 515 to exit the optical waveguide 250 through the front surface 205 or rear surface 206 as the light 225. The portions of the light 215 exiting the front surface 205 or rear surface 206 is indicated in the light 225 by the solid arrows. The portions of the light 515 exiting the front surface 205 or rear surface 206 is indicated in the light 225 by the hashed arrows.

Similar to the previous examples, the exit pupils corresponding to the light 215 and the light 515 are staggered. The distance between the adjacent exit pupils is shown as the distance f. Because the light 515 travels a greater distance in the optical waveguide 250 before exiting the optical waveguide 250 than the light 215, a difference between the optical paths of the light 215 and the light 515 exceeds the coherence length of the light source. Accordingly, the light 225 from adjacent exit pupils received by the eye 280 can both contribute to the display without causing interference. Moreover, the distance d between exit pupils corresponding to the same light (i.e., the light 215 or the 515) is preserved.

Figure 6:
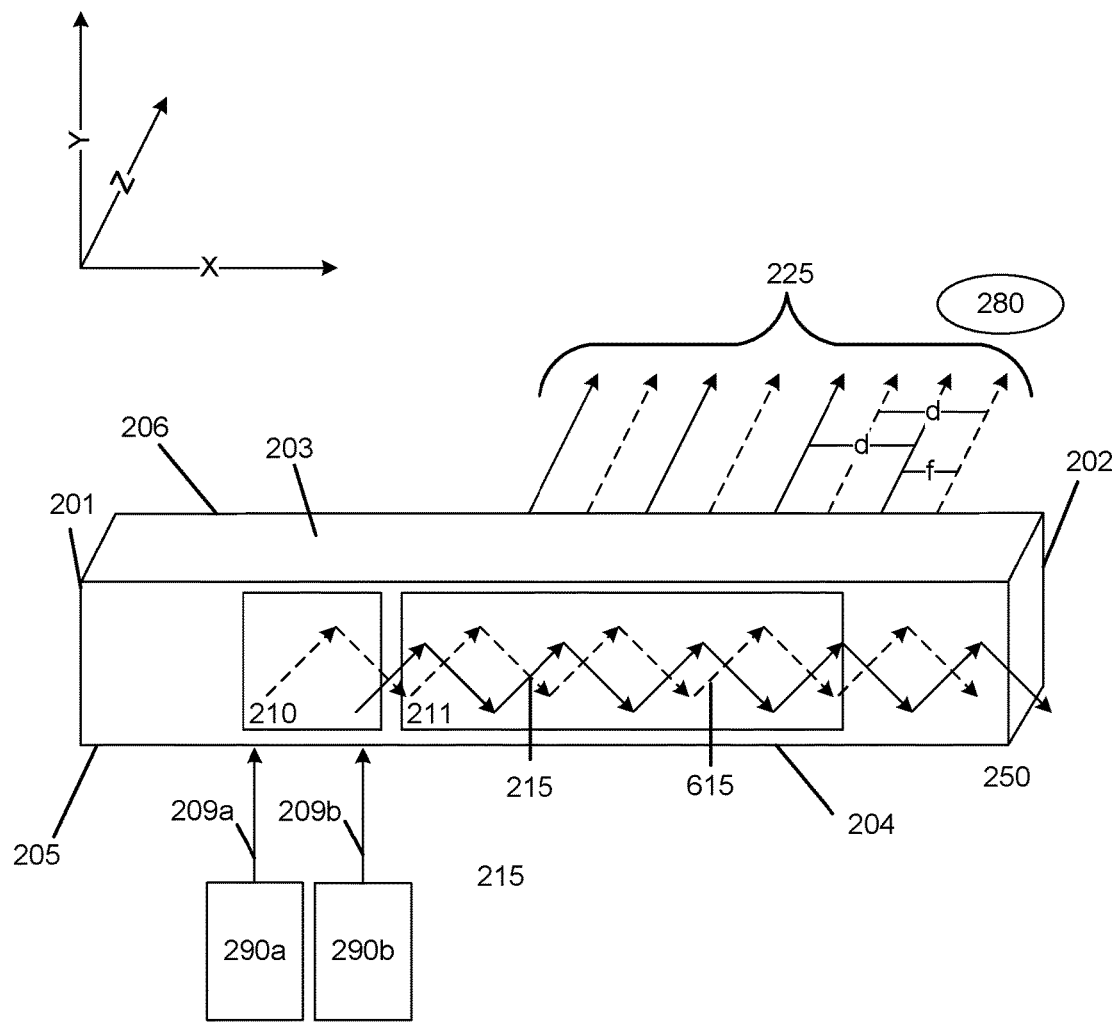

FIG. 6 is an illustration of an exemplary near-eye display system 600. The system 600 includes the optical waveguide 250 and two projectors 290 (i.e., the projectors 290a and 290b). Each of the projectors 290 may use a coherent light source.

Rather than a single light source, the optical waveguide 250 of the system 600 may receive light 209 (i.e., the light 209a and 209b) from a plurality of light sources 290. In the example shown, the OE 210 of the optical waveguide 250 receives the light 209a from the projector 290a and receives the light 209b from the projector 290b. The projectors 290a and 290b may be coherent light sources, and may each have the same coherence length. The light 209a and 209b may represent the same display image.

The projectors 290a and 290b may be spaced such that the light 209a and 209b are received by the OE 210 at different locations. The OE 210 may cause a portion of the lights 209a and 209b to enter the optical waveguide 250 and propagate through the optical waveguide 250 in the x direction. The portion of the light 209a that is propagating in the x direction is the light 215 and is illustrated using the solid arrows. The portion of the light 209b that is propagating in the x direction is the light 615 and is illustrated using the hashed arrows.

As both the light 215 and the light 615 propagate through the optical waveguide 250 and pass through the OE 211, the OE 211 may allow at least a portion of the light 215 and the light 615 to exit the optical waveguide 250 through one or more exit pupils of the rear surface 206 as the light 225. The portions of the light 215 exiting through exit pupils of the rear surface 206 is indicated in the light 225 by the solid arrows. The portions of the light 615 exiting through exit pupils of the rear surface 206 is indicated in the light 225 by the hashed arrows.

Similar to FIGS. 3-5, the exit pupils corresponding to the light 215 and the light 615 are staggered. The distance between the adjacent exit pupils is shown as the distance f. Though individually coherent, the multiple projectors 290 are mutually incoherent. Accordingly, the light 225 from adjacent exit pupils received by the eye 280 may overlap without causing interference.

Note that additional projectors 290 can be used in the system 600 to further increase the intensity and uniformity of the display image received by the eye 280. In addition, to further increase the difference between the optical path length of the light 209a and the optical path length of the light 209b, the projectors 290a and 290b may be moved relative to each other and/or the optical waveguide 250.

For purposes of illustration only, the optical waveguides 250 of FIG. 2-6 are one dimensional. However, any of the optical waveguides 250 of FIG. 2-6 may be implemented as two dimensional waveguides.

Figure 7:
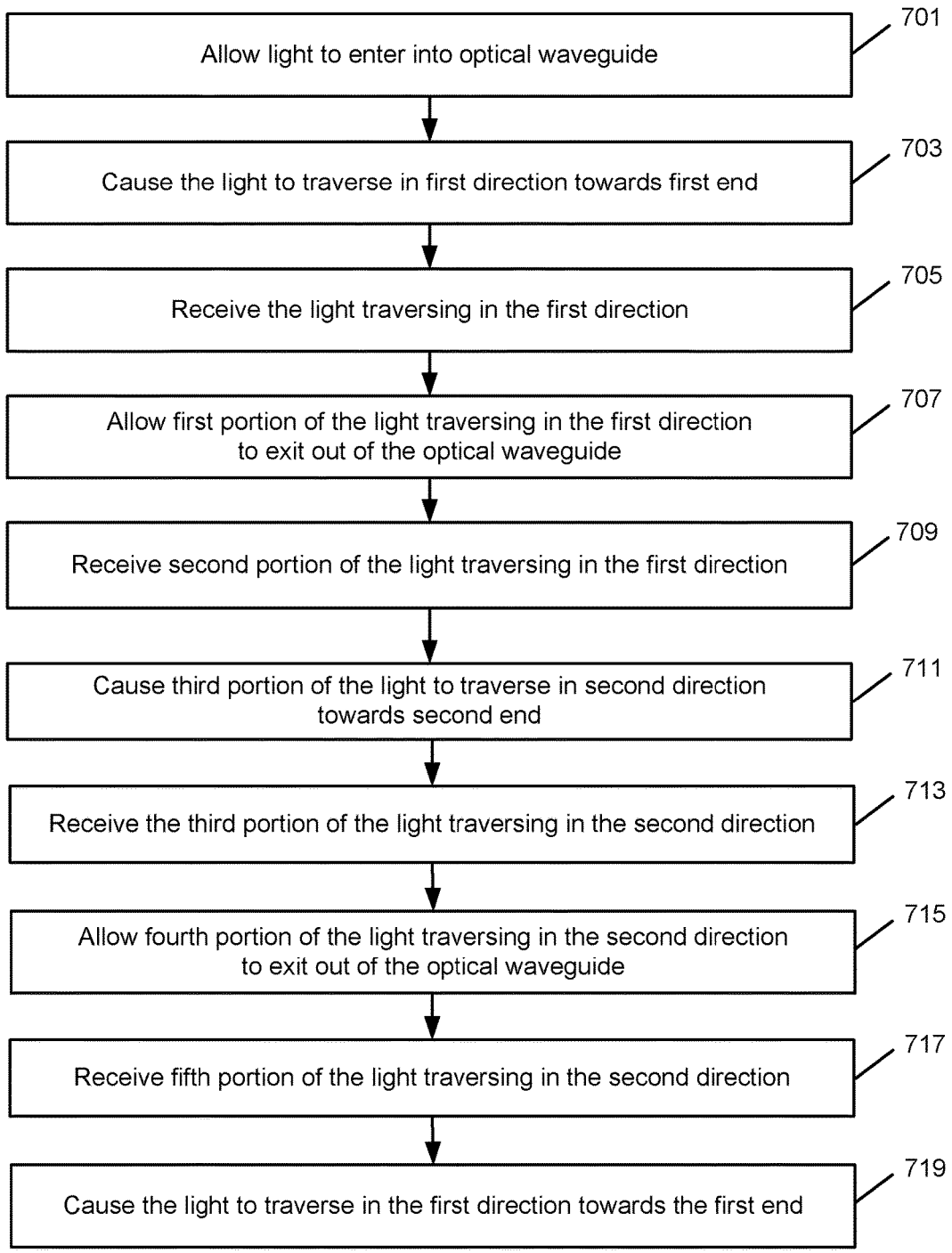
FIG. 7 is an operational flow of an implementation of a method for operating a near-eye display system in a head mounted display device.

FIG. 7 is an operational flow of an implementation of a method 700 for operating a near-eye display system in an HMD device 100. The method 700 may be implemented using the optical waveguide 250, for example.

At 701, light is allowed to enter the optical waveguide. The light 209 may be received from an exit pupil of a projector 290 by a OE 210. The projector 290 may be a coherent light source such as a laser. The coherent light source may be associated with a coherence length. The OE 210 may be a first OE and may be a coating on the front surface 205 of the optical waveguide 250 that allows light 209 received at a particular angle, or range of angles, to enter the optical waveguide 250. The coating may be an SRG having a surface vector with a magnitude of k. Other OEs may be supported such as prisms and mirrors.

At 703, the light is caused to traverse in a first direction towards a first end. The light 215 may be caused to traverse in the first direction by the OE 210. The light 215 may traverse in the first direction by reflecting off of the internal surfaces of the optical waveguide 250. The first direction may be the x direction and the first end may include the right-side surface 202.

At 705, the light traversing in the first direction is received. The light 215 traversing in the first direction may be received by the OE 211. The OE 211 may be the second OE and may also be a surface coating such as an SRG. The OE 211 may also have a surface vector with a magnitude of k. Depending on the implementation, the OE 211 may be located on one or both of the front surface 205 or the rear surface 206 of the optical waveguide 250.

At 707, a first portion of the light traversing in the first direction is allowed to exit out of the optical waveguide 250. The first portion may be a portion of the light 215 and may be allowed to exit the optical waveguide 250 by the OE 211. The first portion of the light 215 may exit through one or more exit pupils of a first set of exit pupils on the rear surface 206 in the z direction as the light 225. The light 225 may form the eye box and may be received by an eye 280 of a wearer of the HMD device 100. Because the OE 211 may be a low efficiency OE, only a relatively small portion of the light 215 may be allowed to exit the optical waveguide 250. The first portion of the light may have a first optical path length.

The exit pupils in the first set of exit pupils may be separated by a distance d. The distance d may ensure that light from only one exit pupil of the first set of exit pupils may be received by the eye 280 of the wearer of the HMD device 100 (i.e., the pupils are non-overlapping). Because the light 209 was received from a coherent light source, if light is received by the eye 280 from more than one of the exit pupils of the first set of exit pupils, the light may interfere.

At 709, a second portion of the light traversing in the first direction is received. The second portion of light may be a portion of the light 215 that was not allowed to exit the optical waveguide 250 by the OE 211. The second portion of the light 215 may be received by the OE 310 of the optical waveguide 250. The OE 310 may be the third OE and may be a coating on the front surface 205 of the optical waveguide 250. The coating may have a surface vector with a magnitude of approximately 2(k).

At 711, a third portion of the light is caused to traverse in a second direction towards a second end. The third portion of the light 215 may be the light 335 and may be caused to traverse in the second direction by the OE 310. The second direction may be an opposite direction to the x direction. The second end may include the left-side surface 201.

At 713, the third portion of the light is received. The light 335 may be received by the OE 211.

At 715, a fourth portion of the light traversing in the second direction is allowed to exit out of the optical waveguide 250. The fourth portion may be a portion of the light 335 and may be allowed to exit the optical waveguide 250 by the OE 211. The fourth portion of the light 335 may exit through one or more exit pupils of a second set of exit pupils on the rear surface 206 in the z direction as part of the light 225. The fourth portion of the light may have a second optical path length. A difference between the first optical path length and the second optical path length may be greater than the coherence length of the coherent light source.

The exit pupils in the second set of exit pupils may also be separated by a distance d. However, because the difference between the first optical path length and the second optical path length is greater than the coherence length of the coherent light source, the first portion of the light may not interfere with the fourth portion of the light. Accordingly, exit pupils from the first set of exit pupils and the second set of exit pupils may be staggered so that light from an exit pupil from the first set of exit pupils and light from an exit pupil from the second set of exit pupils may be received by the eye 280 of the wearer of the HMD device 100 (i.e., the pupils are overlapping). The distance between an exit pupil from the first set of exit pupils and an exit pupil from the second set of exit pupils may be f.

At 717, a fifth portion of the light traversing in the second direction is received. The fifth portion of light may be a portion of the light 335 that was not allowed to exit the optical waveguide 250 by the OE 211. The fifth portion of the light 211 may be received by the OE 410 of the optical waveguide 250. The OE 410 may be the fourth OE and may be a coating on the front surface 205 of the optical waveguide 250. Like the OE 335, the coating may have a surface vector with a magnitude of approximately 2(k).

At 719, a sixth portion of the light is caused to traverse in the first direction towards the first end. The sixth portion of the light 335 may be the light 435 and may be caused to traverse in the x direction by the OE 410. As may be appreciated, the sixth portion of light may again pass through the OE 211, where some or all of the sixth portion may exit the optical waveguide 250 through a third set of exit pupils. The sixth portion of the light may have a third optical path length. A difference between the third optical path length and the second optical path length (and the first optical path length) may be greater than the coherence length of the coherent light source.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, an optical waveguide is provided. The optical waveguide includes a front surface and a rear surface. The optical waveguide further includes a first optical element and a second optical element. The first optical element is configured to allow light from a coherent light source to enter the optical waveguide through the front surface, wherein the light source is associated with a coherence length. The second optical element is configured to allow a first portion of the light to exit the optical waveguide through the rear surface with a first optical path length, and allow a second portion of the light to exit the optical waveguide through the rear surface with a second optical path length, wherein a difference between the first optical path length and the second optical path length is greater than the coherence length.

Implementations may include some or all of the following features. The coherent light source may include a laser. The first optical element may include a diffractive optical element. The first optical element may include a coating on one of the front surface or the rear surface. The coating may be a surface-relief diffraction grating. The optical waveguide may further include a third optical element configured to receive a third portion of the light traveling in a first direction through the optical waveguide, and cause a fourth portion of the light to travel in a second direction through the optical waveguide. The second direction may be an opposite direction of the first direction. The coherent light source may include a first laser and a second laser, and the first portion of light may include light from the first laser and the second portion of light may include light from the second laser. The first portion of the light may exit through a first set of exit pupils and the second portion of light may exit through a second set of exit pupils.

In an implementation, a head mounted display device is provided. The head mounted display includes: a coherent light source, wherein the coherent light source is associated with a coherence length; a controller coupled to the coherent light source and configured to cause the coherent light source to project light comprising a display image; and a plurality of optical waveguides. Each optical waveguide comprises: a first end; a second end; a first optical element configured to: allow the light to enter into the optical waveguide; and cause the light to traverse in a first direction towards the first end; a second optical element configured to: receive the light traversing in the first direction from the first optical element; and allow a first portion of the light traversing in the first direction to exit out of the optical waveguide, wherein the first portion of light has a first optical path length; and a third optical element configured to: receive a second portion of the light traversing in the first direction from the second optical element; and cause a third portion of the light to traverse in a second direction towards the second end, wherein the second optical element is further configured to: receive the third portion of the light traversing in the second direction from the third optical element; and allow a fourth portion of the light traversing in the second direction to exit out of the optical waveguide, wherein the fourth portion of the light has a second optical path length, and further wherein a difference between the first optical path length and the second optical path length is greater than the coherence length.

Implementations may include some or all of the following features. Each optical waveguide may further include a fourth optical element configured to receive a fifth portion of the light traversing in the second direction from the second optical element, and cause a sixth portion of the light to traverse in the first direction towards the first end. Each optical waveguide may further include a front surface and a rear surface. The second optical element of each optical waveguide configured to allow the first portion of the light traversing in the first direction to exit out of the optical waveguide may include the second optical element of each optical waveguide configured to allow the first portion of the light traversing in the first direction to exit out of the optical waveguide through the rear surface. The first optical element of each optical waveguide may include a coating on one of the front surface or the rear surface. The coating may be a surface-relief diffraction grating.

In an implementation, an optical waveguide is provided. The optical waveguide includes a first surface and a second surface; a first optical element that allows light received from a coherent light source to enter the optical waveguide through the first surface or the second surface and traverse in a first direction within the optical waveguide, wherein the coherent light source has a coherence length; a second optical element that receives the light traversing in the first direction, causes a first portion of the light to exit the optical waveguide through the first surface or the second surface, and allows a second portion of the light to continue to traverse in the first direction, wherein the first portion of light has a first optical path length; and a third optical element that receives the second portion of the light traversing in the first direction, and causes a third portion of the light to traverse in a second direction within the optical waveguide, wherein the second optical element further receives the third portion of the light, and allows a fourth portion of the light to exit the optical waveguide through the first surface or the second surface, wherein the fourth portion of light has a second optical path length, and further wherein a difference between the first optical path length and the second optical path length is greater than the coherence length.

Implementations may include some or all of the following features. The first direction and the second direction may be opposite directions. The coherent light source may be a laser. The first optical element, the second optical element, and the third optical elements may be surface-relief diffraction gratings or volumetric gratings. The first portion of the light may exit through a first set of exit pupils and the fourth portion of light may exit through a second set of exit pupils.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An optical waveguide comprising:
    a front surface;
    a rear surface; and
    a first optical element configured to:
        allow light from a coherent light source to enter the optical waveguide through the front surface, wherein the light has a coherence length, wherein the coherent light source comprises a laser; and
    a second optical element configured to:
        allow a first portion of the light to exit the optical waveguide through the rear surface with a first optical path length; and
        allow a second portion of the light to exit the optical waveguide through the rear surface with a second optical path length, wherein a difference between the first optical path length and the second optical path length is greater than the coherence length.

2. The optical waveguide of claim 1, wherein the first optical element comprises a diffractive optical element.

3. The optical waveguide of claim 2, wherein the first optical element comprises a coating on one of the front surface or the rear surface.

4. The optical waveguide of claim 3, wherein the coating is a surface-relief diffraction grating.

5. The optical waveguide of claim 1, further comprising a third optical element configured to:
    receive a third portion of the light traveling in a first direction through the optical waveguide; and
    cause a fourth portion of the light to travel in a second direction through the optical waveguide.

6. The optical waveguide of claim 5, wherein the second direction is an opposite direction of the first direction.

7. The optical waveguide of claim 1, wherein the coherent light source comprises a first laser and a second laser, and the first portion of the light comprises light from the first laser and the second portion of the light comprises light from the second laser.

8. A head mounted display device comprising:
    a coherent light source;
    a controller coupled to the coherent light source and configured to cause the coherent light source to project light comprising a display image, wherein the light has a coherence length; and
    a plurality of optical waveguides, wherein each optical waveguide comprises:
        a first end;
        a second end;
        a first optical element configured to:
            allow the light to enter into the optical waveguide; and
            cause the light to traverse in a first direction towards the first end;
        a second optical element configured to:
        receive the light traversing in the first direction from the first optical element; and
        allow a first portion of the light traversing in the first direction to exit out of the optical waveguide, wherein the first portion of light has a first optical path length; and
        a third optical element configured to:
            receive a second portion of the light traversing in the first direction from the second optical element; and
            cause a third portion of the light to traverse in a second direction towards the second end, wherein the second optical element is further configured to:
            receive the third portion of the light traversing in the second direction from the third optical element; and
            allow a fourth portion of the light traversing in the second direction to exit out of the optical waveguide, wherein the fourth portion of the light has a second optical path length, and further wherein a difference between the first optical path length and the second optical path length is greater than the coherence length.

9. The head mounted display device of claim 8, wherein each optical waveguide further comprises a fourth optical element configured to:
    receive a fifth portion of the light traversing in the second direction from the second optical element; and
    cause a sixth portion of the light to traverse in the first direction towards the first end.

10. The head mounted display device of claim 8, wherein each optical waveguide further comprises a front surface and a rear surface.

11. The head mounted display device of claim 10, wherein the second optical element of each optical waveguide configured to allow the first portion of the light traversing in the first direction to exit out of the optical waveguide comprises the second optical element of each optical waveguide configured to allow the first portion of the light traversing in the first direction to exit out of the optical waveguide through the rear surface.

12. The head mounted display device of claim 10, wherein the first optical element of each optical waveguide comprises a coating on one of the front surface or the rear surface.

13. The head mounted display device of claim 12, wherein the coating is a surface-relief diffraction grating.

14. An optical waveguide comprising:
a first surface and a second surface;
a first optical element that allows light received from a coherent light source to enter the optical waveguide through the first surface or second surface and traverse in a first direction within the optical waveguide, wherein the light has a coherence length;
a second optical element that receives the light traversing in the first direction, causes a first portion of the light to exit the optical waveguide through the first surface or the second surface, and allows a second portion of the light to continue to traverse in the first direction, wherein the first portion of light has a first optical path length; and
a third optical element that receives the second portion of the light traversing in the first direction, and causes a third portion of the light to traverse in a second direction within the optical waveguide, wherein the second optical element further receives the third portion of the light, and allows a fourth portion of the light to exit the optical waveguide through the first surface or the second surface, wherein the fourth portion of light has a second optical path length, and further wherein a difference between the first optical path length and the second optical path length is greater than the coherence length.

15. The optical waveguide of claim 14, wherein the first direction and the second direction are opposite directions.

16. The optical waveguide of claim 14, wherein the coherent light source is a laser.

17. The optical waveguide of claim 14, wherein the first optical element, the second optical element, and the third optical element comprise surface-relief diffraction gratings or volumetric gratings.

* * * * *